(12) United States Patent
Huang

(10) Patent No.: US 8,176,595 B2
(45) Date of Patent: May 15, 2012

(54) SADDLE BRACKET FOR WIPER ADAPTER

(76) Inventor: Shih-Hsien Huang, Kaohsiung (TW)

(*) Notice: Subject to any disclaimer, the term of this patent is extended or adjusted under 35 U.S.C. 154(b) by 254 days.

(21) Appl. No.: 12/659,592

(22) Filed: Mar. 15, 2010

(65) Prior Publication Data

US 2010/0257688 A1 Oct. 14, 2010

Related U.S. Application Data

(60) Provisional application No. 61/202,858, filed on Apr. 13, 2009.

(51) Int. Cl.
*B60S 1/40* (2006.01)

(52) U.S. Cl. ........ 15/250.32; 15/250.43; 403/3; 403/24; 403/321; 403/326; 403/329

(58) Field of Classification Search ............... 15/250.32, 15/250.43, 250.201, 250.44, 250.351; 403/3, 403/4, 101, 321, 326, 329, 24
See application file for complete search history.

(56) References Cited

U.S. PATENT DOCUMENTS

| | | | |
|---|---|---|---|
| 3,725,971 A * | 4/1973 | Quinlan et al. | ............ 15/250.43 |
| 7,055,206 B2 | 6/2006 | Boland | |
| 7,281,294 B2 | 10/2007 | Wilms et al. | |
| 7,337,489 B2 | 3/2008 | Huang | |
| 7,353,562 B2 | 4/2008 | Huang | |
| 7,395,578 B2 | 7/2008 | Huang | |

* cited by examiner

*Primary Examiner* — Gary Graham
(74) *Attorney, Agent, or Firm* — Bacon & Thomas, PLLC

(57) ABSTRACT

A saddle bracket for wiper adapter comprises a bracket chassis and a linking saddle to be extensively compatible in coupling with various types of articulation adapter in vast range. Wherein, the bracket chassis is a prerequisite component and the linking saddle is an optional component so that the bracket chassis can either be used alone or be docked by the linking saddle as an integral entity. Through such versatile structure with comprehensive compatibility, the kind and quantity of the saddle bracket can be reduced. Besides, the accumulative quantity of the defective wipers from annual replaced windshield wiper due to obsolete or aged malfunction can also be indirectly decreased. Thus, not only the vendors and the consumers of the viper can be benefited by the decreasing in manufacturing cost and selling price but also the environmental protection can be benefited by the decreasing in annual replacement quantity.

4 Claims, 19 Drawing Sheets

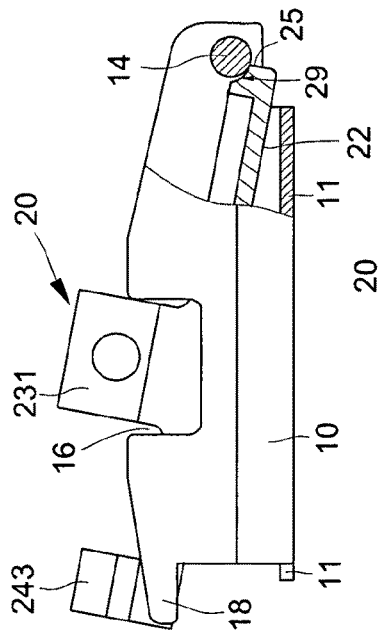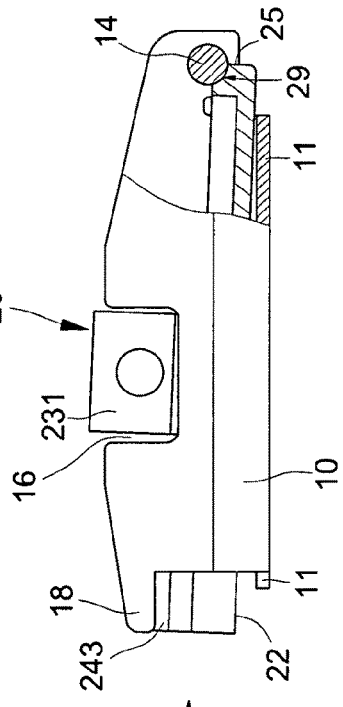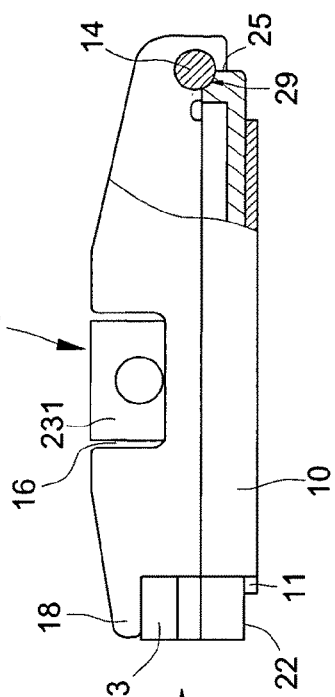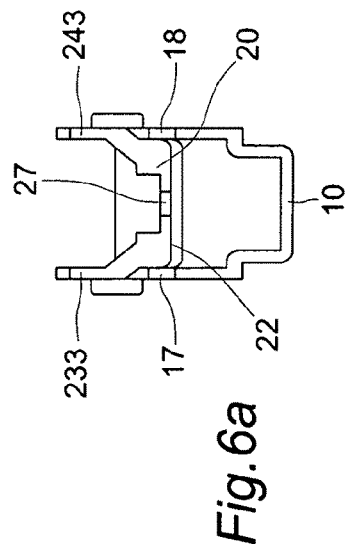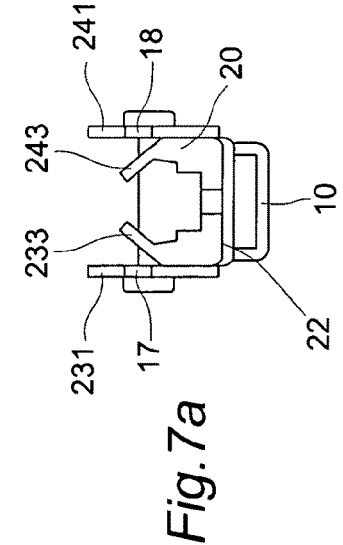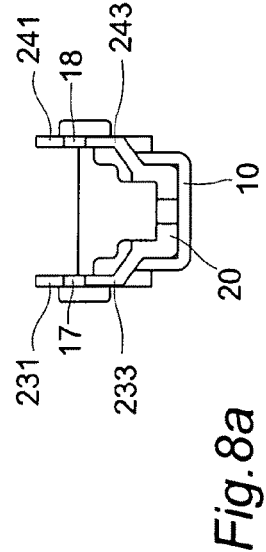

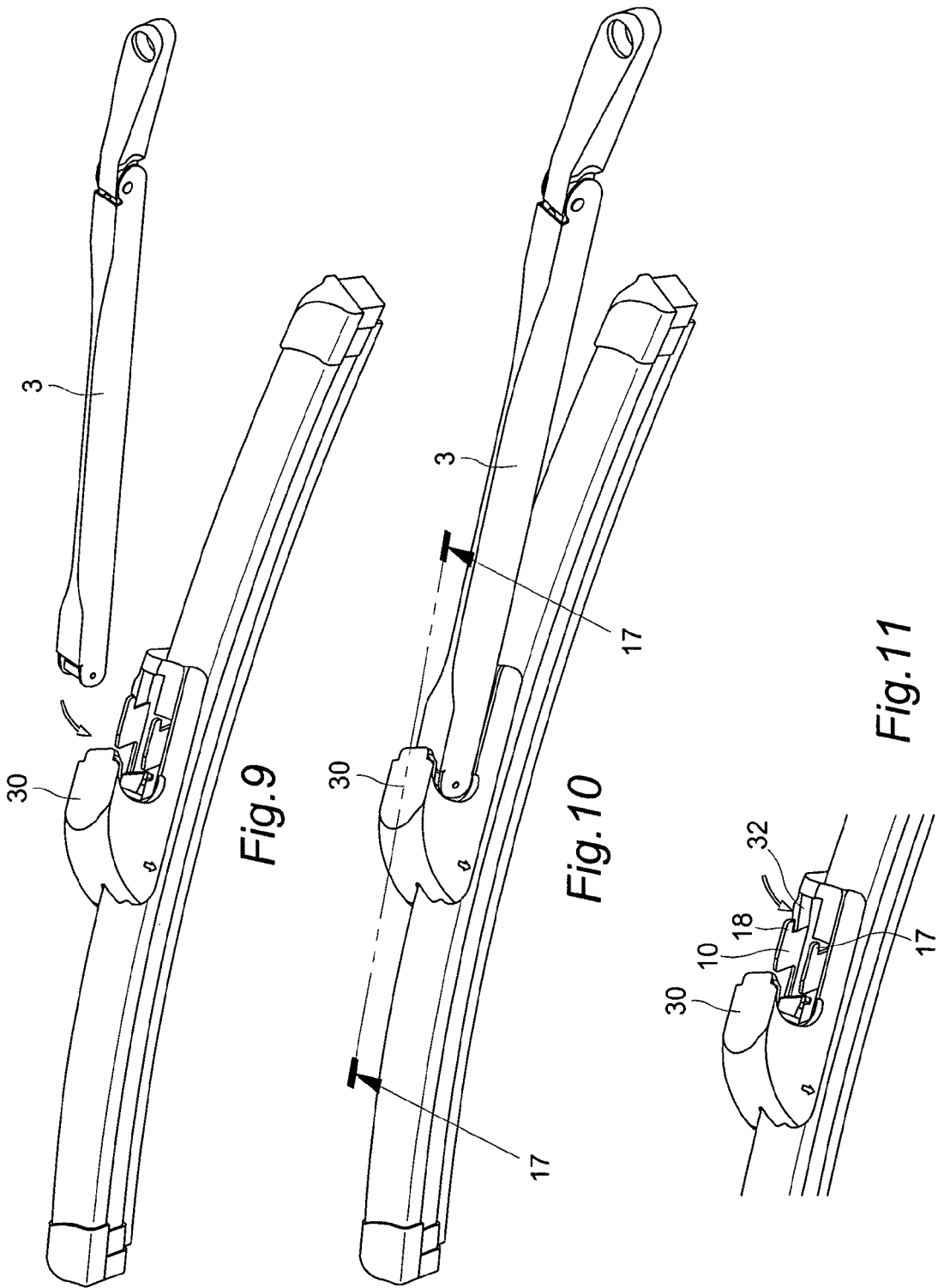

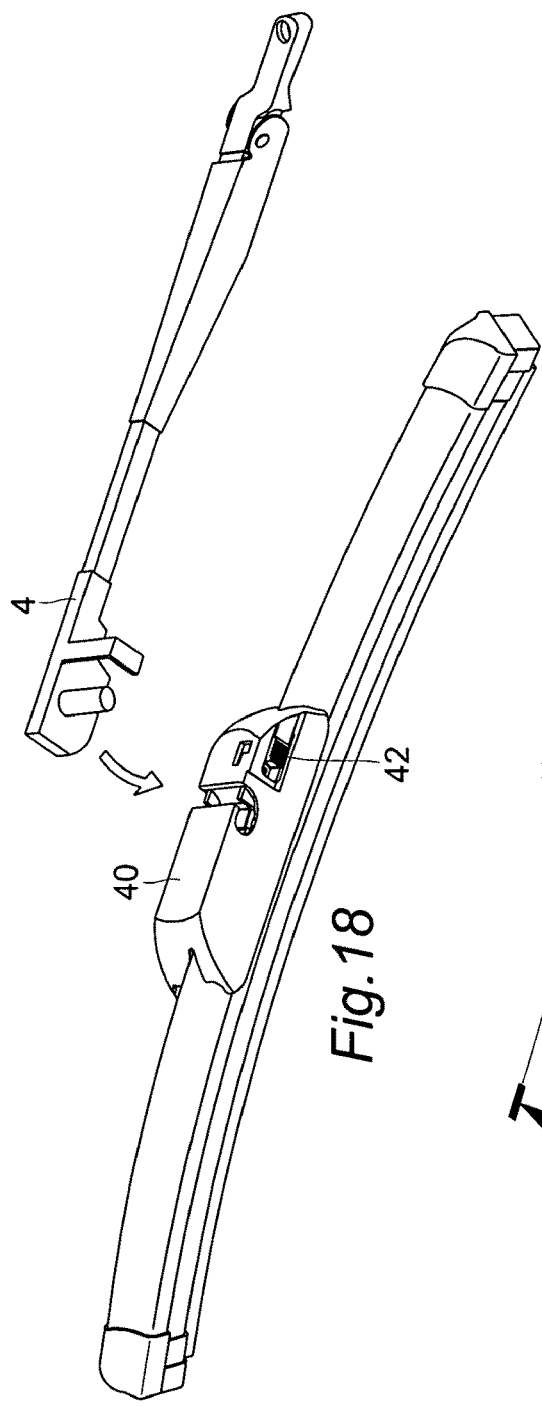
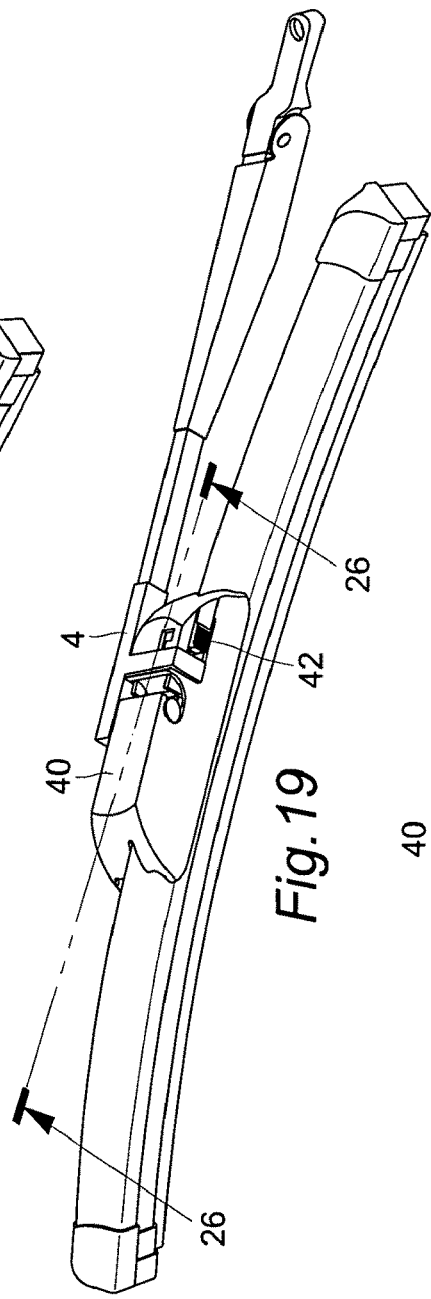
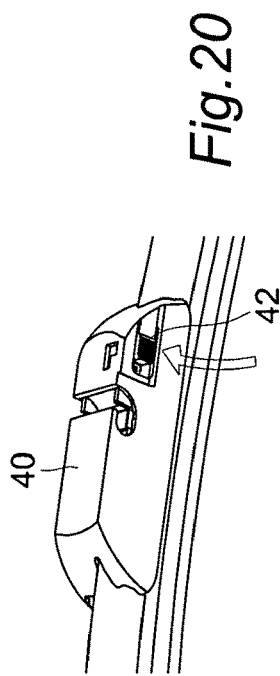
Fig.18
Fig.19
Fig.20

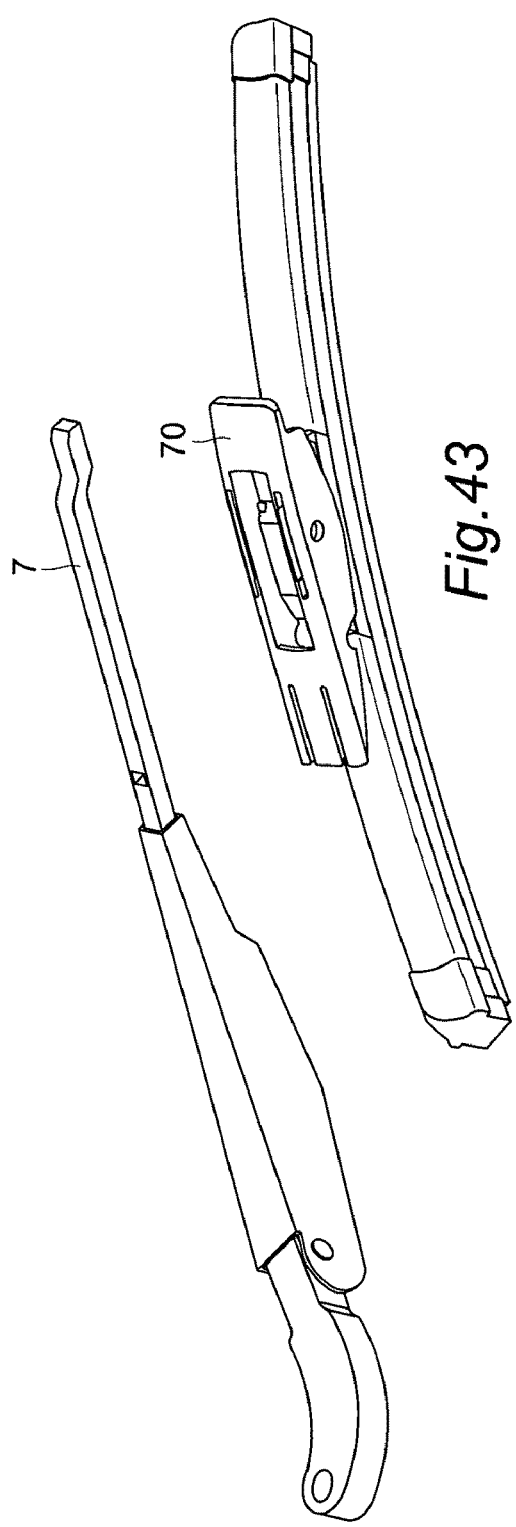
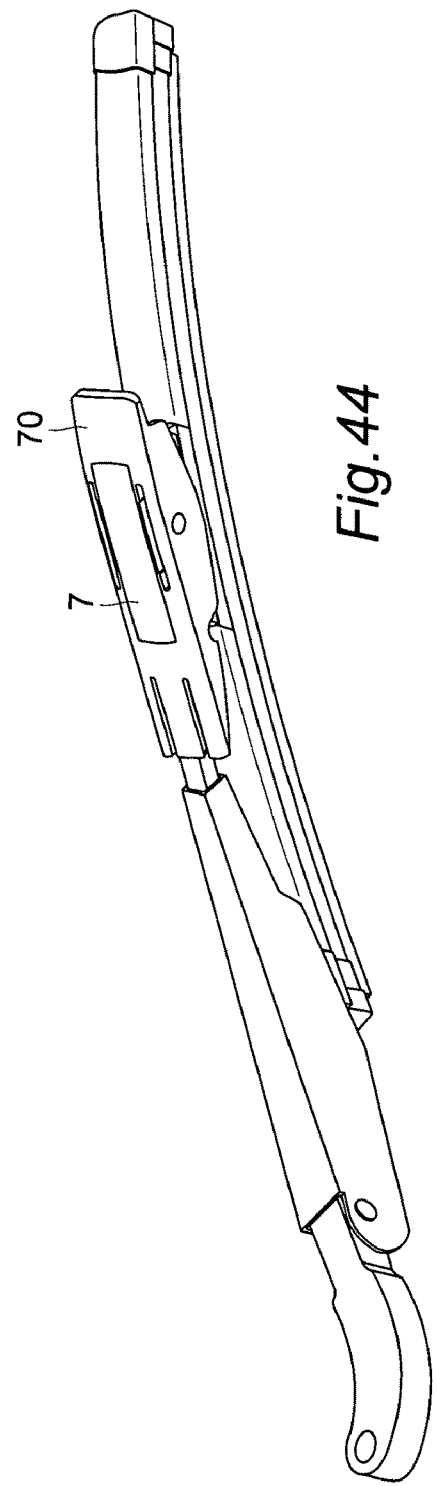
Fig. 43
Fig. 44

US 8,176,595 B2

SADDLE BRACKET FOR WIPER ADAPTER

This application claims the benefit of provisional U.S. Patent Application No. 61/202,858, filed Apr. 13, 2009.

FIELD OF THE PRESENT INVENTION

The present invention relates to a saddle bracket for wiper adapter, particularly for one that features in versatile structure and comprehensive compatibility with various adapters so that not only the vendors and the consumers of the viper can be benefited by the decreasing in manufacturing cost and selling price but also the environmental protection can be benefited by the decreasing in annual replacement quantity due to obsolete or aged defective wiper.

BACKGROUND OF THE INVENTION

Currently, the kind and type of the wiper arm used by the windshield wiper are numerous. To compatibly couple with such numerous wiper arms, corresponding exclusively associated wiper articulation adapter and saddle bracket are required. For example, all the issued USA patents in number of U.S. Pat. Nos. 7,055,206, 7,281,294, 7,337,489, 7,353,562 and 7,395,578 have such foregoing situation.

Virtually, patent U.S. Pat. No. 7,337,489 belongs to "crotch coupling head type" wiper arm with exclusively associated articulation adapter thereof, while patents U.S. Pat. Nos. 7,055,206, 7,281,294 and 7,353,562 are belong to "curbing hook fore type" wiper arm with exclusively associated articulation adapters thereof and patent U.S. Pat. No. 7,395,578 belongs to "dual fluked fore type" wiper arm with exclusively associated articulation adapter thereof. However, keeping abreast with the increasing new vehicle, the new type of wiper arm with exclusively associated articulation adapter for coupling new windshield wiper equipped in new vehicle is required to produce and introduce to the vehicle market accordingly. Unfavorably, not only the cost in extra mold and part is increased but also the difficulty in fabrication and inventory management is increased for the wiper manufacturers. Eventually, all the increasing cost will reflect in the selling market that the consumer will be suffered from the transferring cost incurred.

Moreover, the windshield wiper belongs to consumptive products, which require replacement when its wiping efficiency is declined due to aging effect, which may affect the driving safety. Globally, basing on the existing huge aftermarket quantity and annual selling quantity of vehicle, the accumulative quantity of the obsolete or aged defective wipers from annual replaced windshield wiper might become a heavy burden for the environment protection. If such adverse circumstance keeps going, all the vehicle wiper manufacturers, consumers and en environment protection performers inevitably become losers. Therefore, how to work out an innovative saddle bracket for articulation adapter of the windshield wiper to benefit all the vehicle wiper manufacturers, consumers and en environment protection performers becomes a critical task of urgent issue.

SUMMARY OF THE INVENTION

The primary object of the present invention is to provide a saddle bracket for wiper adapter, which comprises a bracket chassis and a linking saddle to be extensively compatible in coupling with various types of articulation adapter in vast range. Wherein, the bracket chassis is a primary prerequisite component and the linking saddle is an optional subordinate component so that the bracket chassis can either be used alone or be docked by the linking saddle as an integral entity. Through such versatile structure with comprehensive compatibility, the kind and quantity of the saddle bracket can be reduced. Besides, the accumulative quantity of the defective wipers from annual replaced windshield wiper due to obsolete or aged malfunction can also be indirectly decreased. Thus, not only the vendors and the consumers of the viper can be benefited by the decreasing in manufacturing cost and selling price but also the environmental protection can be benefited by the decreasing in annual replacement quantity.

BRIEF DESCRIPTION OF THE DRAWINGS

FIG. 6 is the first schematic view for the docking operation of the present invention.

FIG. 6a is a sectional view taken along the direction 6a as indicated in FIG. 6.

FIG. 7 is the second schematic view for the docking operation of the present invention.

FIG. 7a is a sectional view taken the direction 7a as indicated in FIG. 7.

FIG. 8 is the third schematic view for the docking operation of the present invention.

FIG. 8a is a sectional view taken along the direction 8a as indicated in FIG. 8.

FIG. 9 is the first schematic perspective view showing the integration for the "crotch coupling head type" conventional wiper arm and exclusively associated articulation adapter thereof.

FIG. 10 is the second schematic perspective view showing the integration for the "crotch coupling head type" conventional wiper arm and exclusively associated articulation adapter thereof.

FIG. 11 is the first schematic perspective view showing the exclusively associated articulation adapter for the "crotch coupling head type" conventional wiper arm.

FIG. 18 is the first schematic perspective view showing the integration for the "curbing hook fore type" conventional wiper arm and exclusively associated articulation adapter thereof.

FIG. 19 is the second schematic perspective view showing the integration for the "curbing hook fore type" conventional wiper arm and exclusively associated articulation adapter thereof.

FIG. 20 is the first schematic perspective view showing the exclusively associated articulation adapter for the "curbing hook fore type" conventional wiper arm.

FIG. 43 is the first schematic perspective view showing the integration for the "front inserting head type" conventional wiper arm and exclusively associated articulation adapter thereof.

FIG. 44 is the second schematic perspective view showing the integration for the "front inserting head type" conventional wiper arm and exclusively associated articulation adapter thereof.

DETAILED DESCRIPTION OF THE PREFERRED EMBODIMENTS

Figure 3:
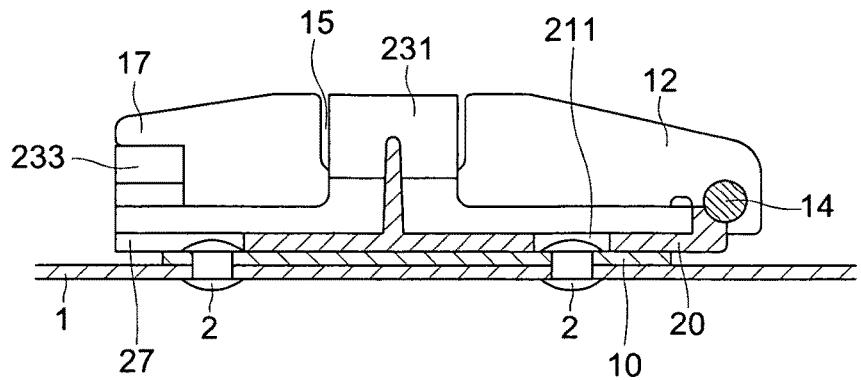
FIG. 3 is a sectional view taken along line 3-3 as indicated in FIG. 2.
Figure 4B:
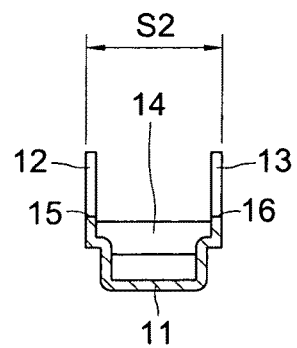
FIG. 4b is a sectional view taken along line 4b-4b as indicated in FIG. 4.
Figure 5B:
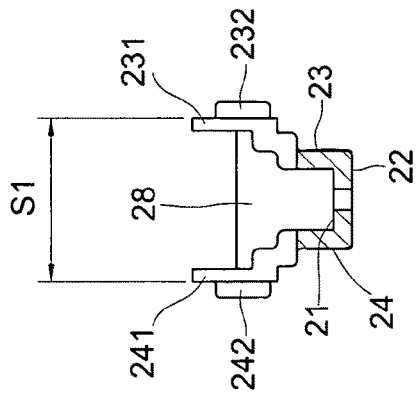
FIG. 5b is a sectional view taken along line 5b-5b as indicated in FIG. 5.

Please refer to FIGS. 1 through 3, FIGS. 4 through 4b and FIGS. 5 through 5c. Other than externally existing anyone wiper arm 3, 4, 5, 6, 7 and an elastic metal keelson strip 1, the saddle bracket for wiper adapter of the present invention comprises a lower bracket chassis 10 and an upper plastic linking saddle 20, wherein:

Said bracket chassis 10 includes a bottom sole 11, a left upright cheek 12, a right upright cheek 13, a fixed coupling spindle 14, a left insetting cutout 15, a right insetting cutout 16, a left locking jetty 17, a right locking jetty 18 and a pair of rivet fixing holes 111, wherein, Said pair rivet fixing holes 111 are created in longitudinal central line of the bracket chassis 10 to match with corresponding pair rivet fixing holes on the elastic metal keelson strip 1 so that the bracket chassis 10 can be securely fixed on the elastic metal keelson strip 1 by two rivets 2 running through said rivet fixing holes; The left upright cheek 12 and right upright cheek 13 are symmetrically juxtaposed at both longitudinal sides of the bottom sole 11 in parallel manner; The fixed coupling spindle 14 is disposed in near lengthwise front section and vertically middle section of the pair left upright cheek 12 and right upright cheek 13 in horizontal manner; The left insetting cutout 15 and right insetting cutout 16 is downwardly, facing to bottom sole 11, formed in rear section of each corresponding left upright cheek 12 and right upright cheek 13 respectively in symmetrically parallel juxtaposition; and the left locking jetty 17 and right locking jetty 18 is backwardly formed in rear section of each corresponding left upright cheek 12 and right upright cheek 13 respectively in symmetrically parallel juxtaposition, The linking saddle 20 is an unitary extruded plastic adapted parallelepiped snugly docked between pair left upright cheek 12 and right upright cheek 13 of the bracket chassis 10 with a top surface 21, a bottom sole 22, a left longitudinal footing sill 23, a right longitudinal footing sill 24, a front transverse footing brim 25, a pair of back transverse footing butts 26, a longitudinal slit 27, a rib plate 28, a crescent coupling sill 29, a left insetting buttress 231, a right insetting buttress 241, a left mating boss 232, a right mating boss 242, a left locking stopper 233, a right locking stopper 243 and a rivet through hole 211, wherein the rivet through hole 211 is created in longitudinal central line of the linking saddle 20 near the front transverse footing brim 25 in manner of running through the top surface 21 and bottom sole 22 to match with corresponding front rivet fixing hole 111 on the elastic metal keelson strip 1, has inner diameter thereof is larger than outer diameter of the rivet 2; The longitudinal slit 27, whose width is larger than outer diameter of the rivet 2, is longitudinally created from the pair back transverse footing butts 26 towards the front transverse footing brim 25 between pair left longitudinal footing sill 23 and right longitudinal footing sill 24 in manner of running through the top surface 21 and bottom sole 22 such that each tail of pair left longitudinal footing sill 23 and right longitudinal footing sill 24 forms each of two prongs from the inner crotch edge of the longitudinal slit 27; The distance between the rivet through hole 211 and the inner crotch edge of the longitudinal slit 27 on the linking saddle 20 is equivalent to the distance between the pair rivet fixing holes 111 on bottom sole 11 of the bracket chassis 10 so that two rivets 2 can run through the bottom sole 22 of the linking saddle 20 and bottom sole 11 of the bracket chassis 10 when the linking saddle 20 docks in the bracket chassis 10 (as shown in FIG. 3); The left insetting buttress 231 and right insetting buttress 241 is upwardly formed in middle section of each corresponding left longitudinal footing sill 23 and right longitudinal footing sill 24 respectively in symmetrically parallel juxtaposition, and said rib plate 28 is vertically disposed In middle section of the pair left insetting buttress 231 and right insetting buttress 241, such that the distance S1 defined between both outer walls of the pair left insetting buttress 231 and right insetting buttress 241 on the linking saddle 20 (as shown in FIG. 5*b*) is equivalent to the distance S2 defined between both outer walls of the pair left upright cheek 12 and right upright cheek 13 of the bracket chassis 10 (as shown in FIG. 4*b*); The relative location of said left insetting buttress 231 and right insetting buttress 241 in the linking saddle 20 corresponds with the relative location of said left insetting cutout 15 and right insetting cutout 16 in the bracket chassis 10, but the width and height of said left insetting buttress 231 and right insetting buttress 241 in the linking saddle 20 are slightly smaller than the width and height of said left insetting cutout 15 and right insetting cutout 16 in the bracket chassis 10; Each said left mating boss 232 and right mating boss 242 is outwardly formed in middle section of each corresponding left insetting buttress 231 and right insetting buttress 241 respectively in symmetrically parallel juxtaposition horizontally; Said crescent coupling sill 29, which is created at the intersection of the front transverse footing brim 25 and the top surface 21, serves as a latching means to the fixed coupling spindle 14 of the bracket chassis 10 when the linking saddle 20 docks in the linking saddle 20; Each of pair back transverse footing butts 26 is backwardly formed in rear section of each corresponding left longitudinal footing sill 23 and right longitudinal footing sill 24 respectively in symmetrically parallel juxtaposition, while each said left locking stopper 233 and right locking stopper 243 is upwardly formed over each one of corresponding pair back transverse footing butts 26 respectively in symmetrically parallel juxtaposition;

Thereby, each left integral and right integral are formed respectively, where the left integral includes tail prong of left longitudinal footing sill 23, left back transverse footing butt 26 and left locking stopper 233 while the right integral includes tail prong of right longitudinal footing sill 24, right back transverse footing butt 26 and right locking stopper 243 such that both of left integral and right integral are susceptible to strain if being suffered from sidewise stress due to flexibility of the plastic material thereof.

Figure 1:
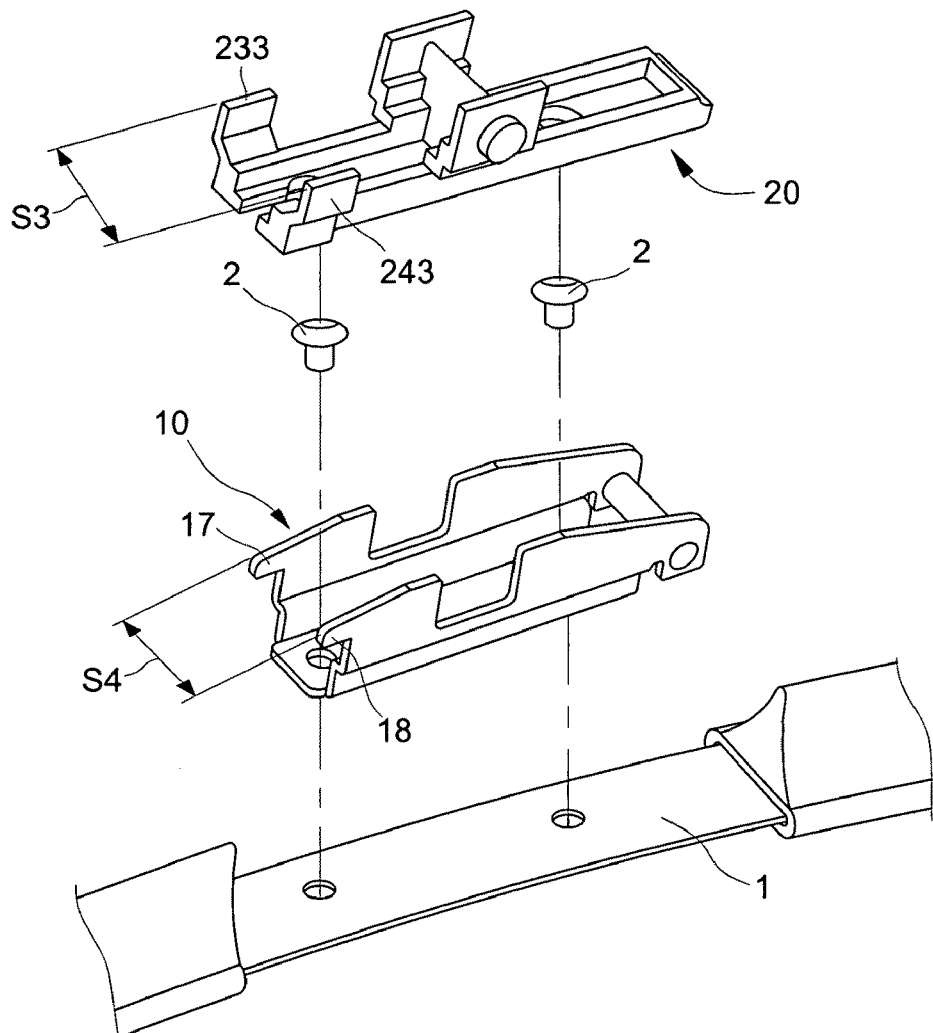
FIG. 1 is an exploded perspective view showing the fragmented components of the present invention.
Figure 2:
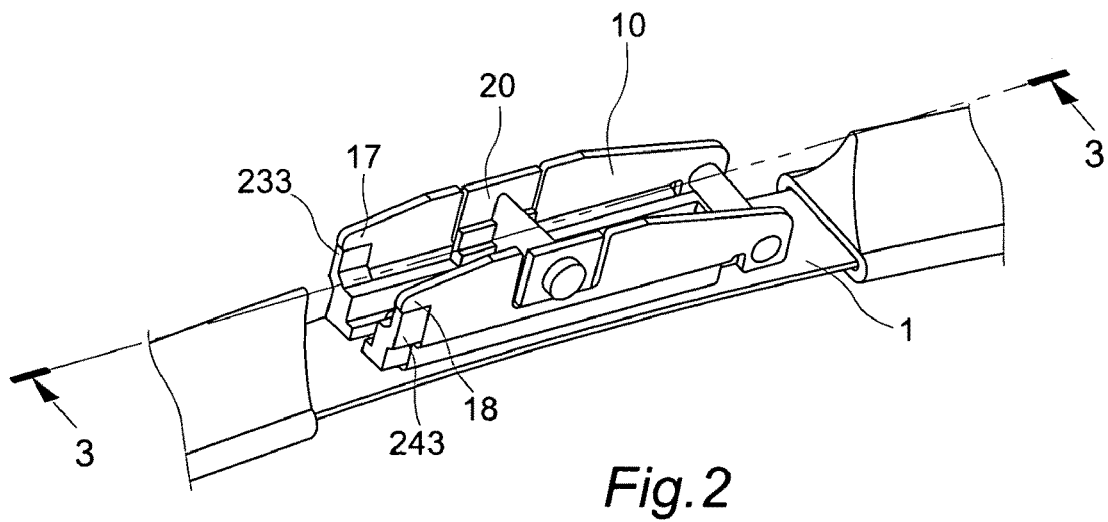
FIG. 2 is an assembly perspective view showing the combined components of the present invention.
Figure 4:
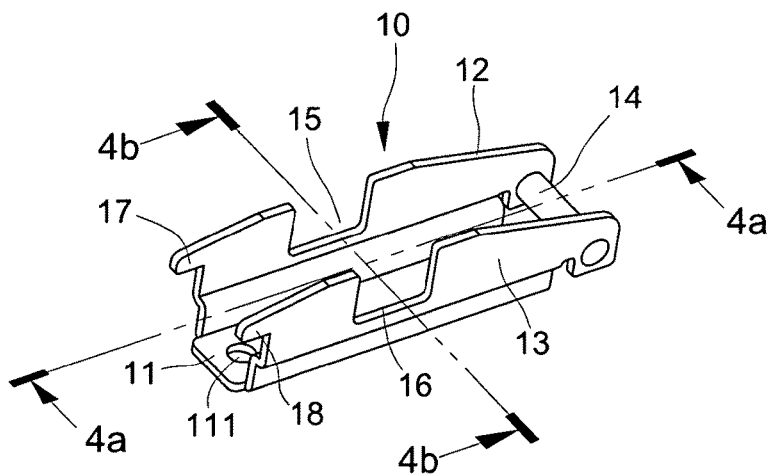
FIG. 4 is a perspective view for the bracket chassis of the present invention.
Figure 4A:
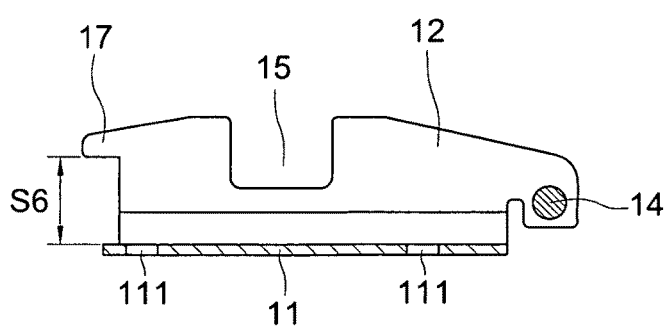
FIG. 4a is a sectional view taken along line 4a-4a as indicated in FIG. 4.
Figure 5C:
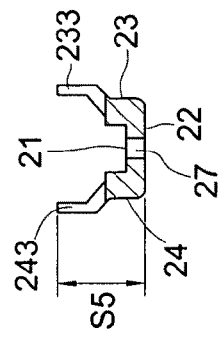
FIG. 5c is a sectional view taken along line 5c-5c as indicated in FIG. 5.
Figure 5:
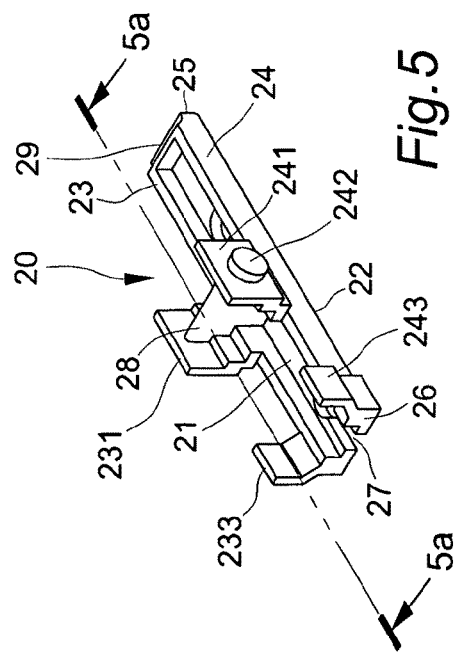
FIG. 5 is a perspective view for the linking saddle of the present invention.
Figure 5A:
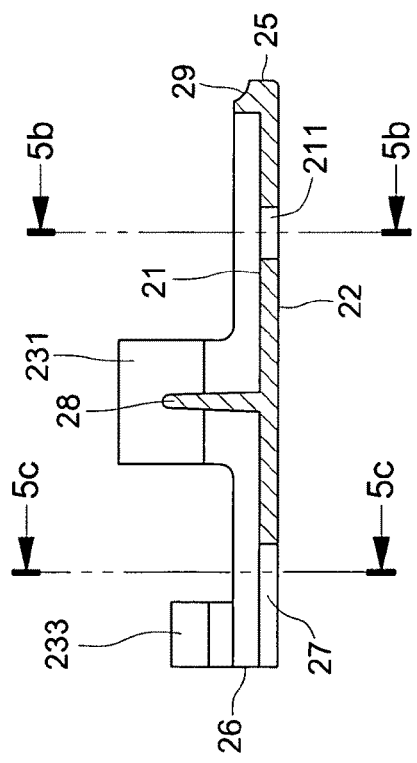
FIG. 5a is a sectional view taken along line 5a-5a as indicated in FIG. 5.
Figure 12:
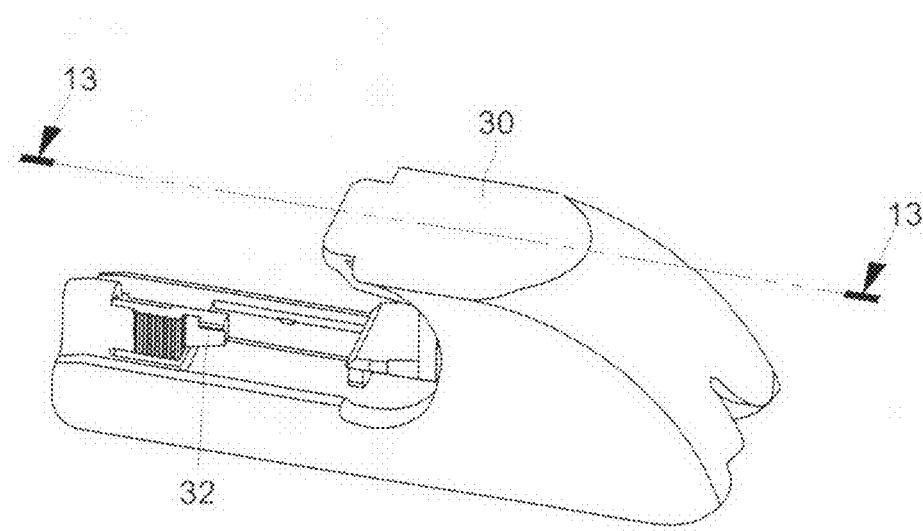
FIG. 12 is the second schematic perspective view showing the exclusively associated articulation adapter for the "crotch coupling head type" conventional wiper arm.
Figure 13:
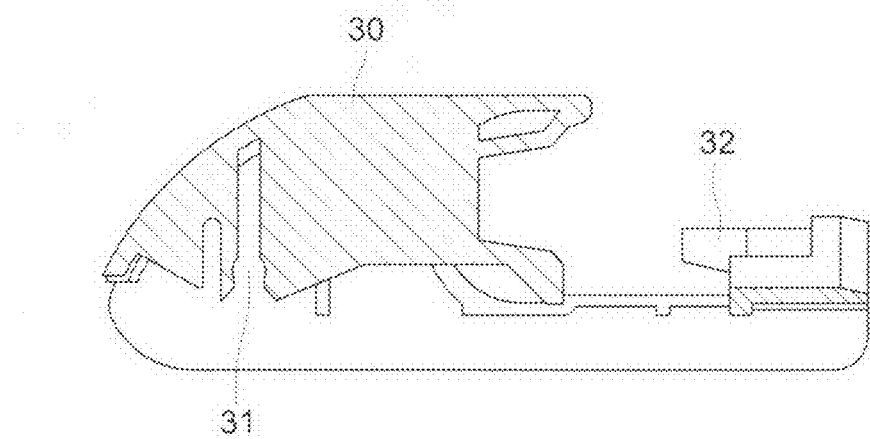
FIG. 13 is a sectional view taken along line 13-13 as indicated in FIG. 12.

The width S3 defined between the outer walls of the left locking stopper 233 and right locking stopper 243 on the linking saddle 20 equals the width S4 defined between the outer walls of the left locking jetty 17 and right locking jetty 18 on the bracket chassis 10 (as shown in FIG. 1); and The height S5 defined from the bottom sole 22 to the top surface of the left locking stopper 233 on the linking saddle 20 (as shown in FIG. 5*c*) approximately equals the height S6 defined from the bottom sole 11 to the bottom surface of the left locking jetty 17 on the linking saddle 20 (as shown in FIG. 4*a*); Similarly, the height S5 defined from the bottom sole 22 to the top surface of the right locking stopper 243 on the linking saddle 20 (as shown in FIG. 5*c*) approximately equals the height S6 defined from the bottom sole 11 to the bottom surface of the right locking jetty 18 on the linking saddle 20 as well (as shown in FIG. 4*a*).

Please refer to FIGS. 6 through 8 and FIGS. 6*a* through 8*a*. describe the assembly procedure of the present invention in steps as follows:

(a). Firstly, put the bottom sole 22 of the linking saddle 20 into the location between the pair left upright cheek 12 and right upright cheek 13 of the bracket chassis 10, then move the crescent coupling sill 29 on the front transverse footing brim 25 of the linking saddle 20 touching against the fixed coupling spindle 14 of the bracket chassis 10 (as shown in FIG. 6) so that the bottom surfaces of the pair left locking stopper 233 and right locking stopper 243 on the linking saddle 20 will contact the top surfaces of the pair left locking jetty 17 and right locking jetty 18 on the bracket chassis 10 (as shown in FIG. 6*a*);

(b). Secondly, exert downwardly force on the rear section of the linking saddle 20 to forcibly push the pair left locking stopper 233 and right locking stopper 243 further downward so that the pair left locking stopper 233 and right locking stopper 243 are inwardly bent to each other because they are confined by the pair left upright cheek 12 and right upright cheek 13 of the bracket chassis 10 and provided certain bending space allowance from the longitudinal slit 27 at the back transverse footing butts 26 of the linking saddle 20 (as shown in FIGS. 7 and 7a);

(c). Finally, continue to further exert downwardly force on the rear section of the linking saddle 20 to forcibly push the pair left locking stopper 233 and right locking stopper 243 more downward so that the pair left locking stopper 233 and right locking stopper 243 hardly overcome the confinement of the pair left upright cheek 12 and right upright cheek 13 of the bracket chassis 10 as well as barely pass the pair left locking jetty 17 and right locking jetty 18 on the bracket chassis 10, then the pair left locking stopper 233 and right locking stopper 243 on the linking saddle 20 will be caught by the pair left locking jetty 17 and right locking jetty 18 on the bracket chassis 10 so that the pair left locking stopper 233 and right locking stopper 243 will be justly latched beneath the bottom surfaces of the pair left locking jetty 17 and right locking jetty 18; Thereby, by means of a front curb served by the fixed coupling spindle 14 and a back curb served by the pair left locking jetty 17 and right locking jetty 18 (as shown in FIGS. 8 and 8a), not only the linking saddle 20 is firmly docked in the bracket chassis 10 but also the pair left insetting buttress 231 and right insetting buttress 241 of the linking saddle 20 are properly held in the corresponding pair left insetting cutout 15 and right insetting cutout 16 on the bracket chassis 10.

For beneficially putting the present invention in practical application, the lower bracket chassis 10 is a prerequisite as used to be securely fixed on the external existing elastic metal keelson strip 1 while the upper linking saddle 20 is optional for those popular wiper arms, which are possibly compatible with the present invention.

Figure 14:
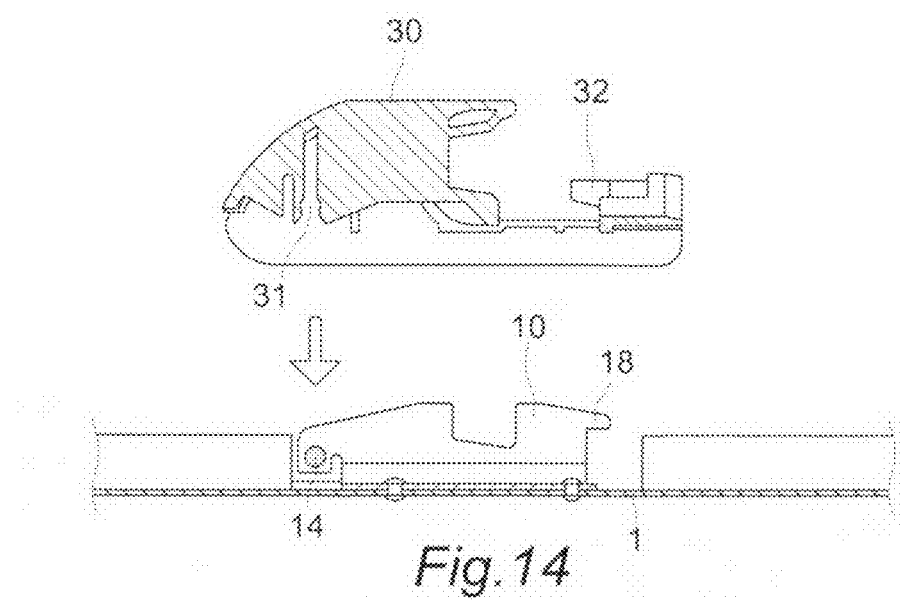
FIG. 14 is the first schematic perspective view showing the coupling operation between the "crotch coupling head type" conventional wiper arm with exclusively associated articulation adapter thereof and the present invention.
Figure 15:
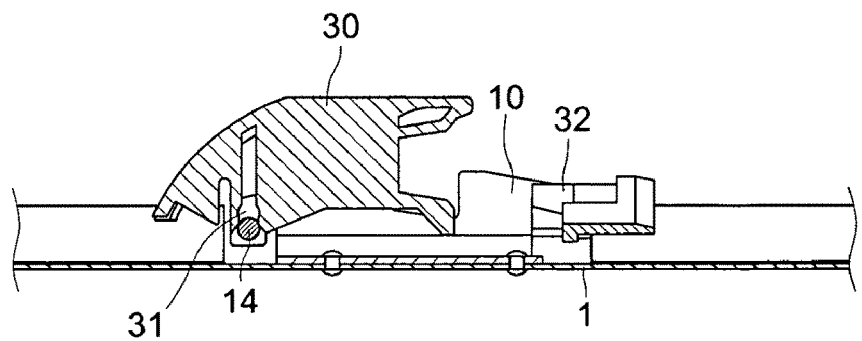
FIG. 15 is the second schematic perspective view showing the coupling operation between the "crotch coupling head type" conventional wiper arm with exclusively associated articulation adapter thereof and the present invention.
Figure 16:
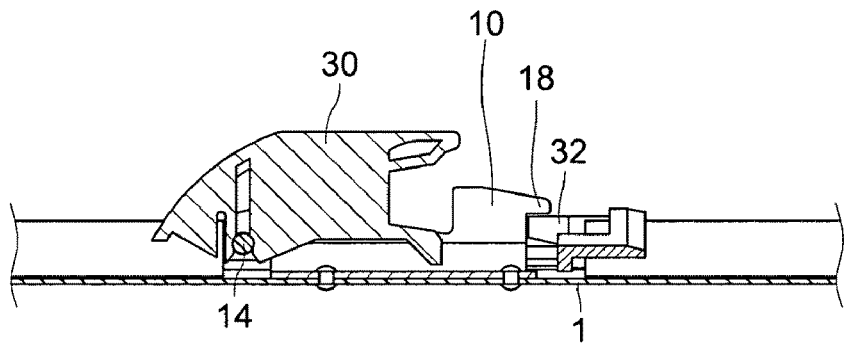
FIG. 16 is the third schematic perspective view showing the coupling operation between the "crotch coupling head type" conventional wiper arm with exclusively associated articulation adapter thereof and the present invention.
Figure 17:
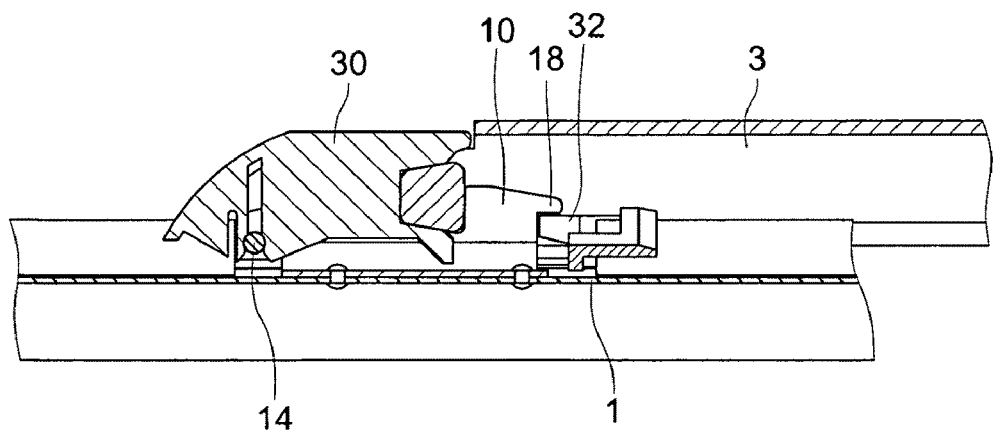
FIG. 17 is a sectional view taken along line 17-17 as indicated in FIG. 10.
Figure 21:
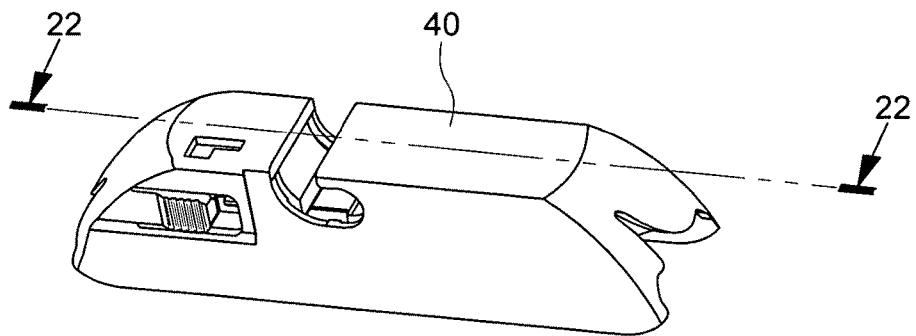
FIG. 21 is the second schematic perspective view showing the exclusively associated articulation adapter for the "curbing hook fore type" conventional wiper arm.
Figure 22:
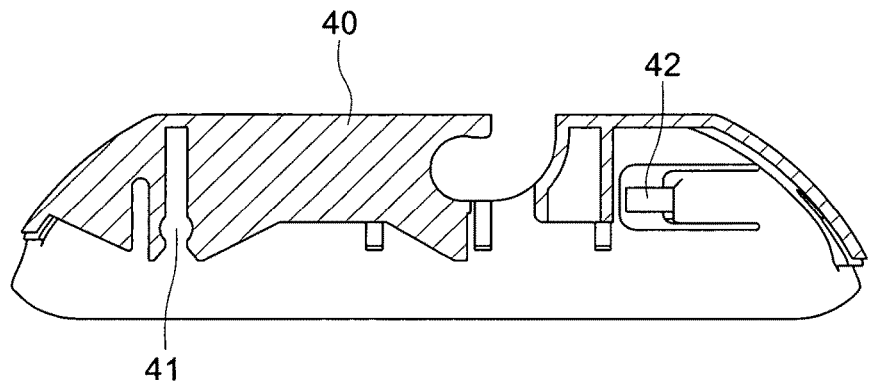
FIG. 22 is a sectional view taken along line 22-22 as indicated in FIG. 21.

Please refer to FIGS. 9 through 17, which show the exemplary embodiment of the present invention applied in the "crotch coupling head type" wiper arm 3 with exclusively associated articulation adapter 30, which comprises a pair of front flexible coupling notches 31 and a pair of rear elastic latching juts 32. The coupling operation between the "crotch coupling head type" conventional wiper arm 3 with exclusively associated articulation adapter 30 thereof and the saddle bracket of the present invention is accomplished via the pair front flexible coupling notches 31 and pair rear elastic latching juts 32 by following procedure: Firstly, couple the pair flexible coupling notches 31 with the fixed coupling spindle 14 of the bracket chassis 10; and Secondly, force and insert the pair elastic latching juts 32 downwards to the beneath of the bottom surfaces of the pair left locking jetty 17 and right locking jetty 18 (as shown in FIGS. 14 through 16) to finish the coupling operation. Therefore, the linking saddle 20 of the present invention is not required in this exemplary embodiment. If the articulation adapter 30 is required to dismantle from the bracket chassis 10 of the present invention, the dismantling procedure can be accomplished by following simple steps: Firstly, inwardly squeeze the pair elastic latching juts 32 of the articulation adapter 30 to shift away the bottom surfaces of the pair left locking jetty 17 and right locking jetty 18 (as hollow arrowhead shown in FIG. 11); and Secondly, upwardly lift the rear elastic latching juts 32 in tilt manner to pull out the articulation adapter 30 away from the bracket chassis 10 under detaching manner of the pair left locking jetty 17 and right locking jetty 18 to finish the dismantling procedure.

Figure 23:
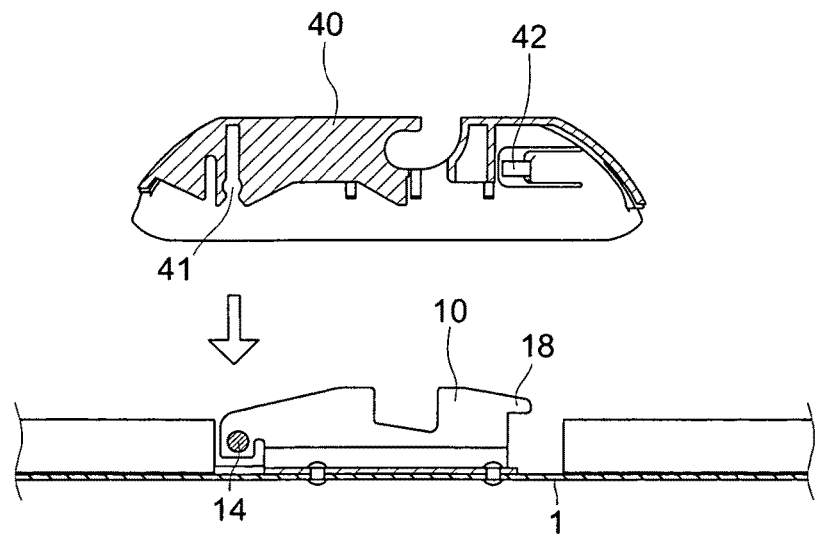
FIG. 23 is the first schematic perspective view showing the coupling operation between the "curbing hook fore type" conventional wiper arm with exclusively associated articulation adapter thereof and the present invention.
Figure 24:
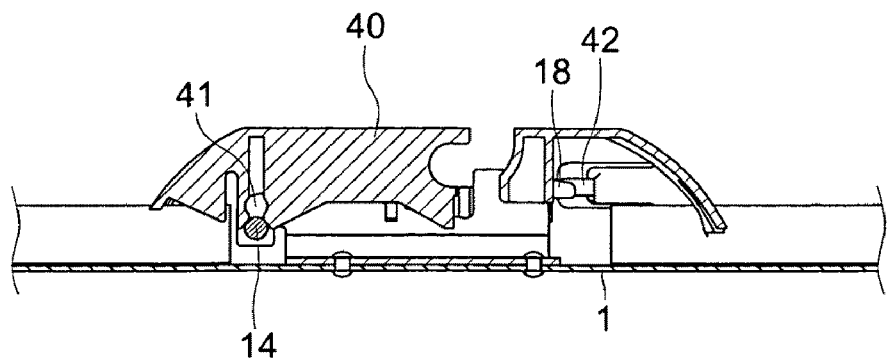
FIG. 24 is the second schematic perspective view showing the coupling operation between the "curbing hook fore type" conventional wiper arm with exclusively associated articulation adapter thereof and the present invention.
Figure 25:
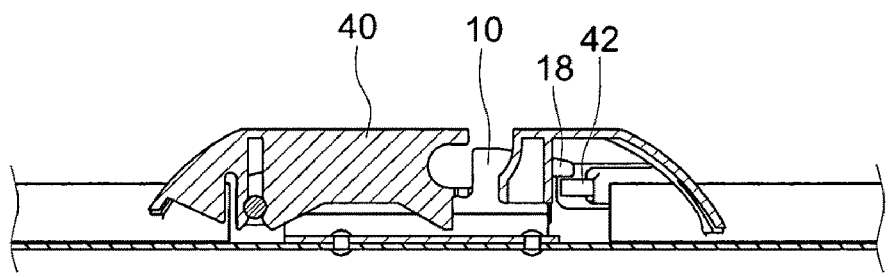
FIG. 25 is the third schematic perspective view showing the coupling operation between the "curbing hook fore type" conventional wiper arm with exclusively associated articulation adapter thereof and the present invention.
Figure 26:
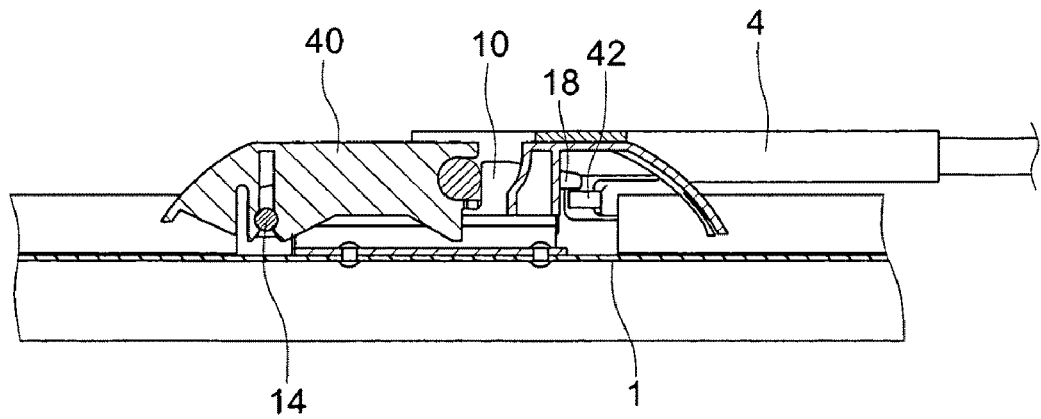
FIG. 26 is a sectional view taken along line 26-26 as indicated in FIG. 19.
Figure 27:
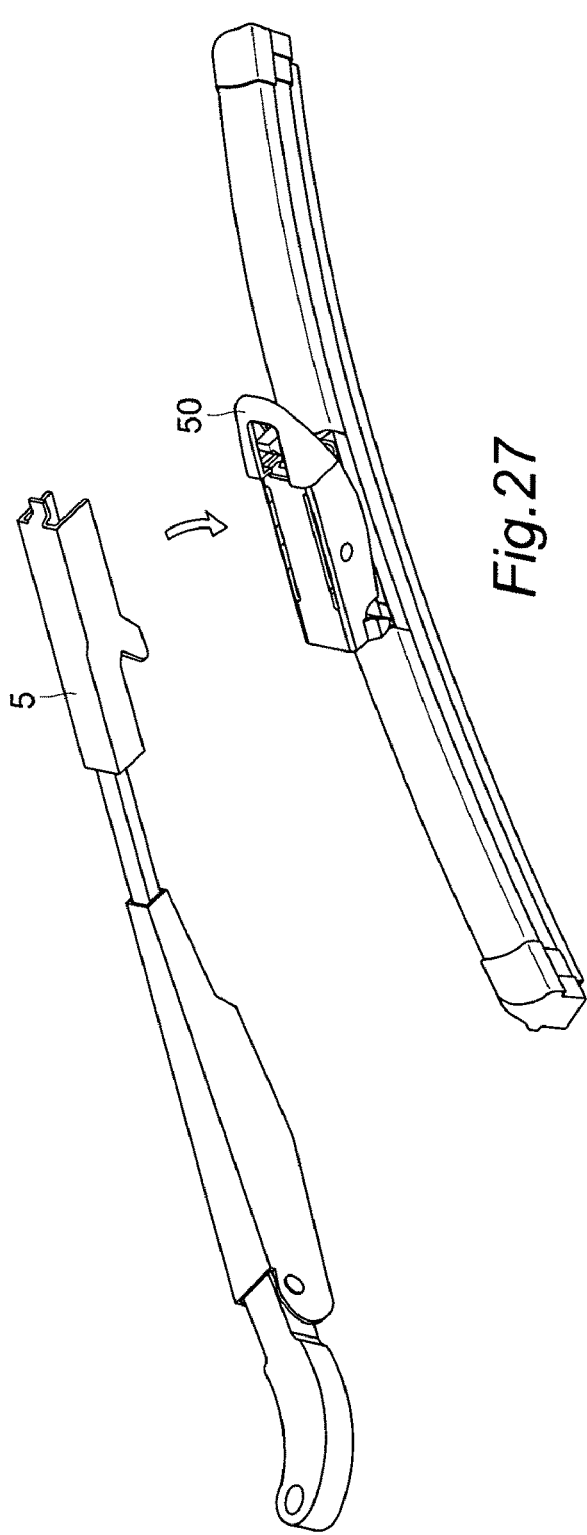
FIG. 27 is the first schematic perspective view showing the integration for the "dual fluked fore type" conventional wiper arm and exclusively associated articulation adapter thereof.
Figure 28:
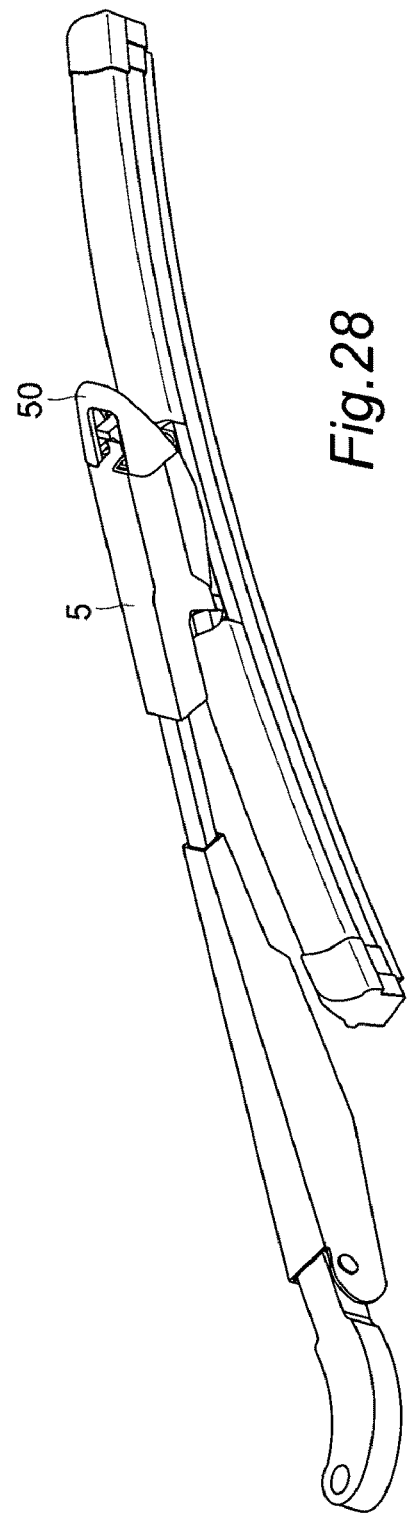
FIG. 28 is the second schematic perspective view showing the integration for the "dual fluked fore type" conventional wiper arm and exclusively associated articulation adapter thereof.
Figure 29:
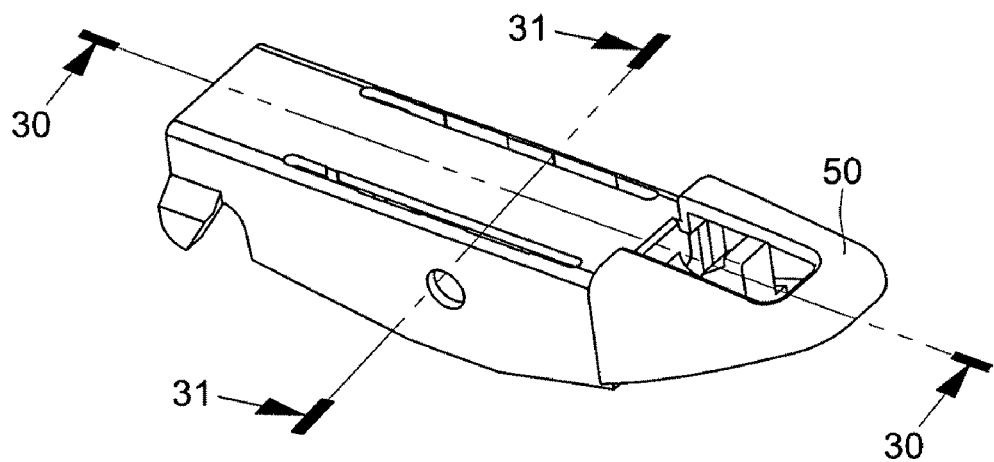
FIG. 29 is a schematic perspective view showing the exclusively associated articulation adapter for the "dual fluked fore type" conventional wiper arm.
Figure 30:
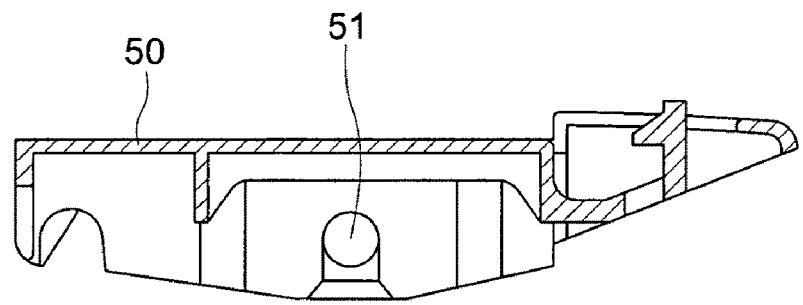
FIG. 30 is a sectional view taken along line 30-30 as indicated in FIG. 29.
Figure 31:
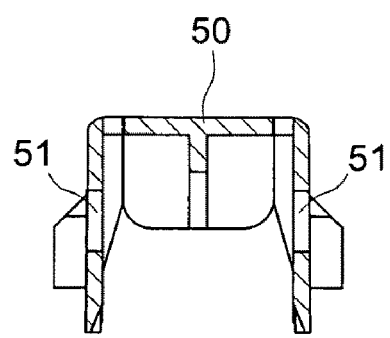
FIG. 31 is a sectional view taken along line 31-31 as indicated in FIG. 29.

Please refer to FIGS. 18 through 26, which show the exemplary embodiment of the present invention applied in the "curbing hook fore type" wiper arm 4 with exclusively associated articulation adapter 40, which comprises a pair of front flexible coupling notches 41 and a pair of rear elastic latching juts 42. Because the flexible coupling notches 41 and elastic latching juts 42 for articulation adapter 40 in this embodiment are corresponding counterparts flexible coupling notches 31 and elastic latching juts 32 of the previous embodiment for articulation adapter 30, both of the coupling operation and dismantling procedure between the "curbing hook fore type" conventional wiper arm 4 with exclusively associated articulation adapter 40 thereof and the saddle bracket of the present invention can be accomplished in similar ways to that between the "curbing hook fore type" conventional wiper arm 3 with exclusively associated articulation adapter 30 thereof and the saddle bracket of the present invention. Namely, the coupling operation is accomplished by following procedure: Firstly, couple the pair flexible coupling notches 41 with the fixed coupling spindle 14 of the bracket chassis 10; and Secondly, force and insert the pair elastic latching juts 42 downwards to the beneath of the bottom surfaces of the pair left locking jetty 17 and right locking jetty 18 (as shown in FIGS. 23 through 25) to finish the coupling operation. Therefore, the linking saddle 20 of the present invention is not required in this exemplary embodiment. The dismantling procedure of the articulation adapter 40 from the bracket chassis 10 can be accomplished by following simple steps: Firstly, inwardly squeeze the pair elastic latching juts 42 of the articulation adapter 40 to shift away the bottom surfaces of the pair left locking jetty 17 and right locking jetty 18 (as hollow arrowhead shown in FIG. 20); and Secondly, upwardly lift the rear elastic latching juts 42 in tilt manner to pull out the articulation adapter 40 away from the bracket chassis 10 under detaching manner of the pair left locking jetty 17 and right locking jetty 18 to finish the dismantling procedure.

Figure 34:
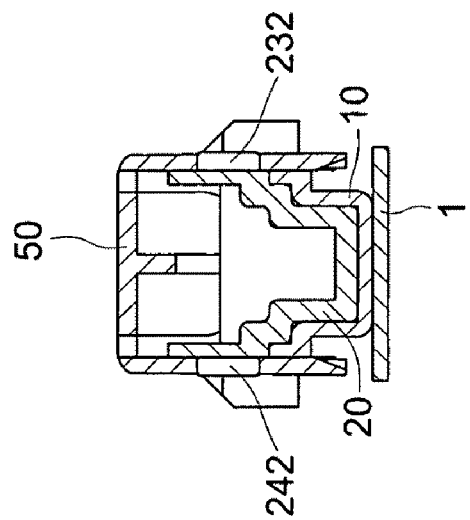
FIG. 34 is the third schematic perspective view showing the coupling operation between the "dual fluked fore type" conventional wiper arm with exclusively associated articulation adapter thereof and the present invention.
Figure 33:
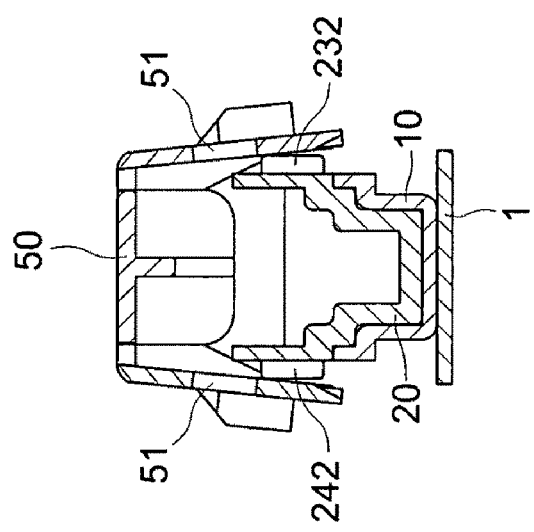
FIG. 33 is the second schematic perspective view showing the coupling operation between the "dual fluked fore type" conventional wiper arm with exclusively associated articulation adapter thereof and the present invention.
Figure 32:
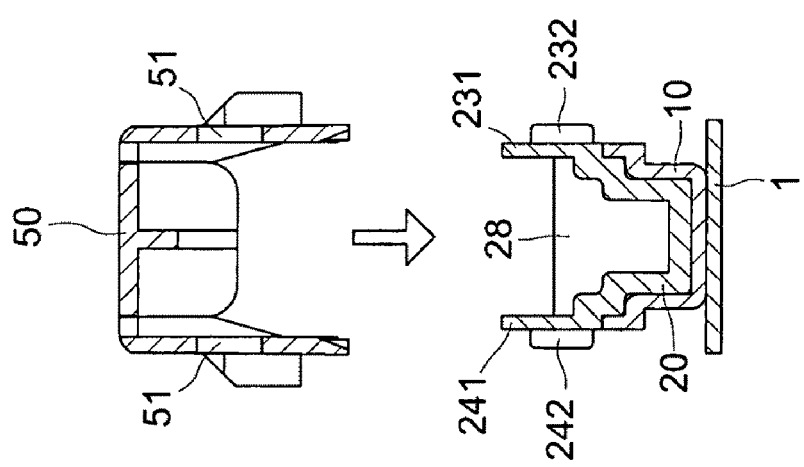
FIG. 32 is the first schematic perspective view showing the coupling operation between the "dual fluked fore type" conventional wiper arm with exclusively associated articulation adapter thereof and the present invention.
Figure 35:
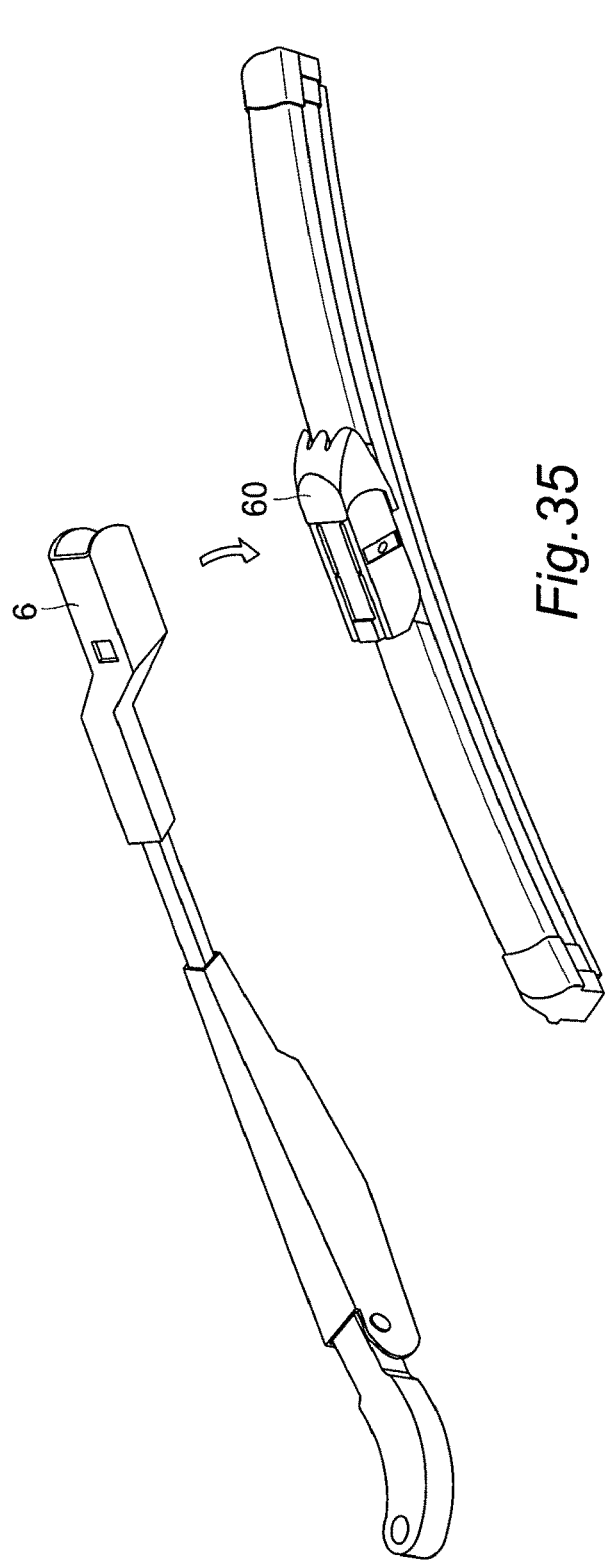
FIG. 35 is the first schematic perspective view showing the integration for the "jacketing canopy head type " conventional wiper arm and exclusively associated articulation adapter thereof.
Figure 36:
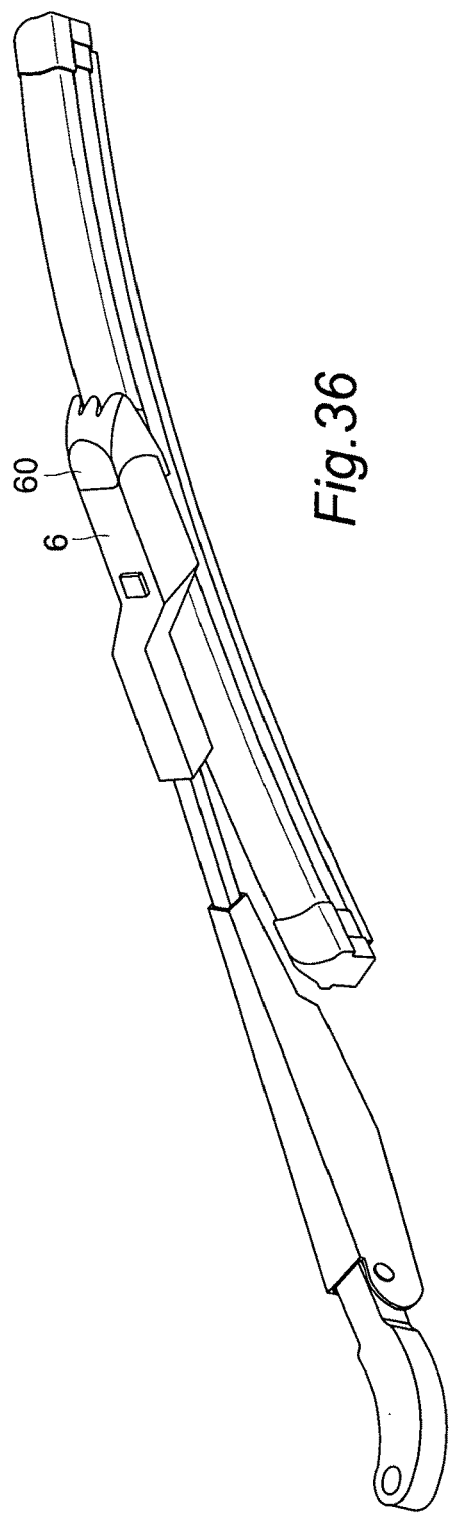
FIG. 36 is the second schematic perspective view showing the integration for the "jacketing canopy head type" conventional wiper arm and exclusively associated articulation adapter thereof.
Figure 37:
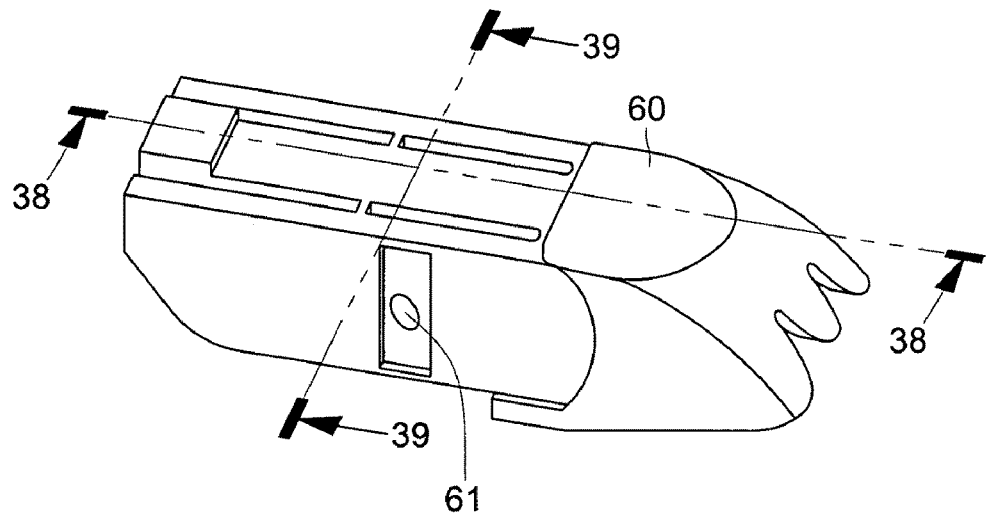
FIG. 37 is a schematic perspective view showing the exclusively associated articulation adapter for the "jacketing canopy head type" conventional wiper arm.
Figure 38:
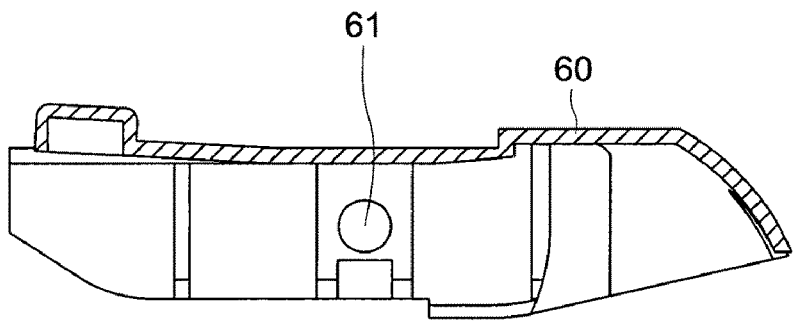
FIG. 38 is a sectional view taken along line 38-38 as indicated in FIG. 37.
Figure 39:
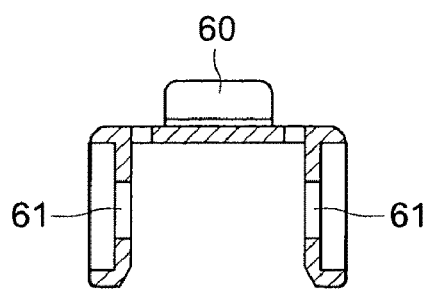
FIG. 39 is a sectional view taken along line 39-39 as indicated in FIG. 37.

Please refer to FIGS. 27 through 34, which show the exemplary embodiment of the present invention applied in the "dual fluked fore type" wiper arm 5 with exclusively associated articulation adapter 50, which comprises a pair of boss catching holes 51 punched on pair cheeks of the articulation adapter 50 respectively. Because the wiper arm 5 with exclusively associated articulation adapter 50 thereof are not compatible with the bracket chassis 10, the docked integral entity of the bracket chassis 10 and linking saddle 20 in the present invention are required in this exemplary embodiment. As shown in FIGS. 32 through 34, the coupling operation is accomplished by following procedure: Firstly, align and couple the pair boss catching holes 51 of the articulation adapter 50 with the left mating boss 232 and right mating boss 242; and Secondly, force and insert the pair boss catching holes 51 downwards to securely catch on the left mating boss 232 and right mating boss 242 to finish the coupling operation. Because the docked integral entity of the bracket chassis 10 and linking saddle 20 in the present invention are used in this exemplary embodiment, the dismantling procedure of the articulation adapter 50 from the bracket chassis 10 of the present invention is unnecessary.

Figure 42:
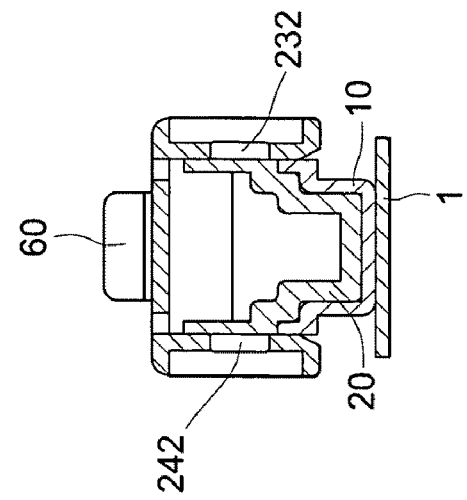
FIG. 42 is the third schematic perspective view showing the coupling operation between the "jacketing canopy head type" conventional wiper arm with exclusively associated articulation adapter thereof and the present invention.
Figure 41:
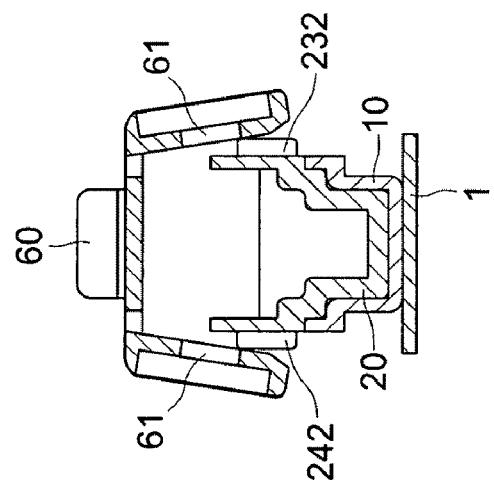
FIG. 41 is the second schematic perspective view showing the coupling operation between the "jacketing canopy head type" conventional wiper arm with exclusively associated articulation adapter thereof and the present invention.
Figure 40:
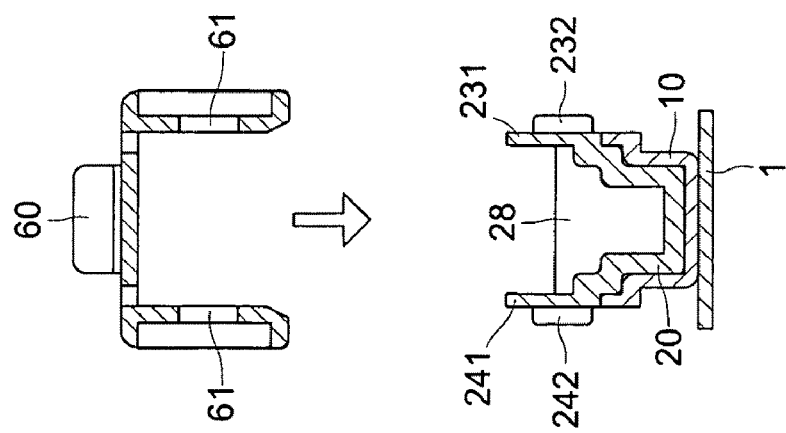
FIG. 40 is the first schematic perspective view showing the coupling operation between the "jacketing canopy head type" conventional wiper arm with exclusively associated articulation adapter thereof and the present invention.
Figure 45:
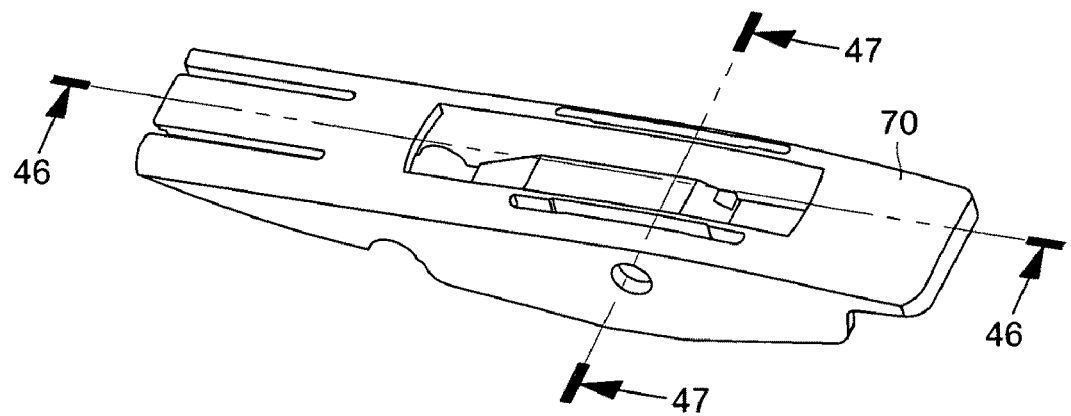
FIG. 45 is a schematic perspective view showing the exclusively associated articulation adapter for the "front inserting head type" conventional wiper arm.
Figure 46:
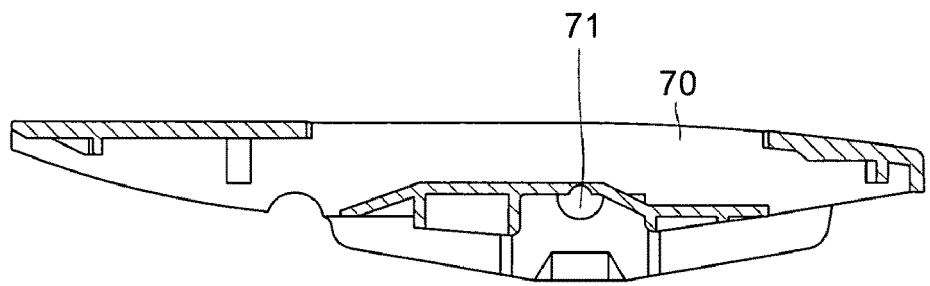
FIG. 46 is a sectional view taken along line 46-46 as indicated in FIG. 45.
Figure 47:
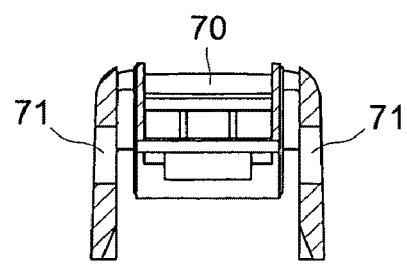
FIG. 47 is a sectional view taken along line 47-47 as indicated in FIG. 45.

Please refer to FIGS. 35 through 42, which show the exemplary embodiment of the present invention applied in the "dual fluked head type" wiper arm 6 with exclusively associated articulation adapter 60, which comprises a pair of boss latching holes 61 punched on pair cheeks of the articulation adapter 60 respectively. Similar to the situation in the "dual fluked fore type" wiper arm 5 with exclusively associated articulation adapter 50, because the wiper arm 6 with exclusively associated articulation adapter 60 thereof are not compatible with the bracket chassis 10, the docked integral entity of the bracket chassis 10 and linking saddle 20 in the present invention are required in this exemplary embodiment. Because the boss latching holes 61 for articulation adapter 60 in this embodiment are corresponding counterparts boss catching holes 51 of the previous embodiment for articulation adapter 50, the coupling operation between the "dual fluked head type" conventional wiper arm 6 with exclusively associated articulation adapter 60 thereof and the saddle bracket of the present invention can be accomplished in similar way to that between the "dual fluked fore type" conventional wiper arm 5 with exclusively associated articulation adapter 50 thereof and the saddle bracket of the present invention. Namely, as shown in FIGS. 40 through 42, the coupling operation is accomplished by following procedure: Firstly, align and couple the pair boss latching holes 61 of the articulation adapter 60 with the left mating boss 232 and right mating boss 242; and Secondly, force and insert the pair boss latching holes 61 downwards to securely catch on the left mating boss 232 and right mating boss 242 to finish the coupling operation. Because the docked integral entity of the bracket chassis 10 and linking saddle 20 in the present invention are used in this exemplary embodiment, the dismantling procedure of the articulation adapter 60 from the bracket chassis 10 of the present invention is unnecessary.

Figure 50:
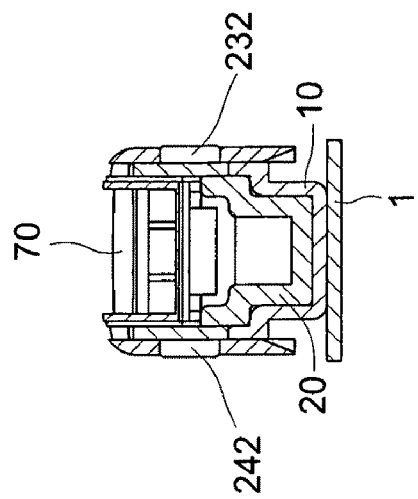
FIG. 50 is the third schematic perspective view showing the coupling operation between the "front inserting head type" conventional wiper arm with exclusively associated articulation adapter thereof and the present invention showing the coupling operation between the "front inserting head type" conventional wiper arm with exclusively associated articulation adapter thereof and the present invention.
Figure 49:
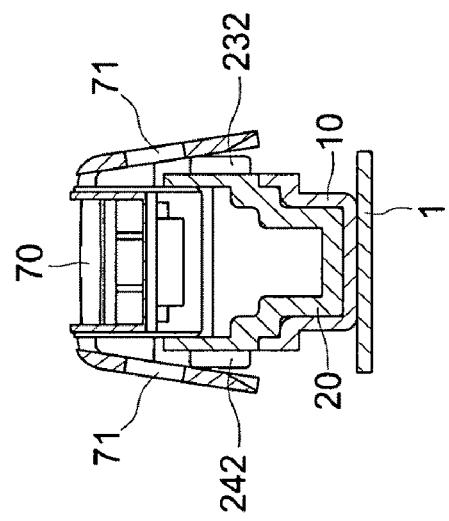
FIG. 49 is the second schematic perspective view showing the coupling operation between the "front inserting head type" conventional wiper arm with exclusively associated articulation adapter thereof and the present invention.
Figure 48:
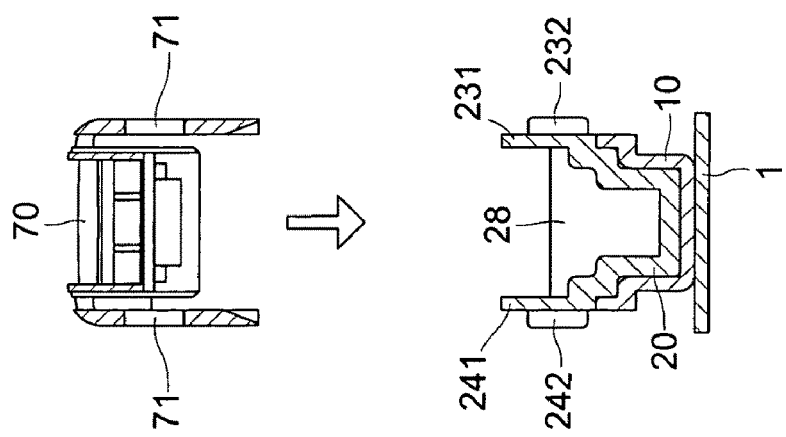
FIG. 48 is the first schematic perspective view showing the coupling operation between the "front inserting head type" conventional wiper arm with exclusively associated articulation adapter thereof and the present invention.

Please refer to FIGS. 43 through 50, which show the exemplary embodiment of the present invention applied in the "front inserting head type" wiper arm 7 with exclusively associated articulation adapter 70, which comprises a pair of boss latching holes 71 punched on pair cheeks of the articulation adapter 70 respectively. Similar to the situation in the "dual fluked fore type" wiper arm 5 with exclusively associated articulation adapter 50, because the wiper arm 7 with exclusively associated articulation adapter 70 thereof are not compatible with the bracket chassis 10, the docked integral entity of the bracket chassis 10 and linking saddle 20 in the present invention are required in this exemplary embodiment. Because the boss latching holes 71 for articulation adapter 70 in this embodiment are corresponding counterparts boss catching holes 51 of the previous embodiment for articulation adapter 50, the coupling operation between the "front inserting head type" conventional wiper arm 7 with exclusively associated articulation adapter 70 thereof and the saddle bracket of the present invention can be accomplished in similar way to that between the "dual fluked fore type" conventional wiper arm 5 with exclusively associated articulation adapter 50 thereof and the saddle bracket of the present invention. Namely, as shown in FIGS. 48 through 50, the coupling operation is accomplished by following procedure: Firstly, align and couple the pair boss latching holes 71 of the articulation adapter 70 with the left mating boss 232 and right mating boss 242; and Secondly, force and insert the pair boss latching holes 71 downwards to securely catch on the left mating boss 232 and right mating boss 242 to finish the coupling operation. Because the docked integral entity of the bracket chassis 10 and linking saddle 20 in the present invention are used in this exemplary embodiment, the dismantling procedure of the articulation adapter 70 from the bracket chassis 10 of the present invention is unnecessary.

Basing on the foregoing exemplary embodiments, the saddle bracket of the present invention can be compatibly applied in various types of wiper arm with exclusively articulation adapter with great industrial practicality and novel improvement, which meet the basic patentable criterion.

What is claimed is:
1. A saddle bracket for wiper adapter, comprising:
a lower bracket chassis;
and an upper plastic linking saddle, wherein said bracket chassis includes a bottom sole, a left upright cheek, a right upright cheek, a fixed coupling spindle, a left insetting cutout, a right insetting cutout, a left locking jetty, a right locking jetty and a pair of rivet fixing holes, wherein said pair rivet fixing holes are created in a longitudinal central line of the bracket chassis; said left upright cheek and right upright cheek are symmetrically juxtaposed at both longitudinal sides of the bottom sole in a parallel manner; said fixed coupling spindle is disposed in a lengthwise front section and vertically middle section of the pair left upright cheek and right upright cheek in a horizontal manner; each said left insetting cutout and right insetting cutout is downwardly, facing to the bottom sole, formed in a rear section of each corresponding left upright cheek and right upright cheek respectively in symmetrically parallel juxtaposition; and each said left locking jetty and right locking jetty is backwardly formed in the rear section of each corresponding left upright cheek and right upright cheek respectively in symmetrically parallel juxtaposition; and wherein said linking saddle is an unitary extruded plastic adapted parallelepiped, includes a top surface, a bottom sole, a left longitudinal footing sill, a right longitudinal footing sill, a front transverse footing brim, a pair of back transverse footing butts, a longitudinal slit, a rib plate, a crescent coupling sill, a left insetting buttress, a right insetting buttress, a left mating boss, a right mating boss, a left locking stopper, a right locking stopper and a rivet through hole, wherein said rivet through hole is created in a longitudinal central line of the linking saddle near the front transverse footing brim in manner of running through the top surface and bottom sole; said longitudinal slit is longitudinally created from the pair of back transverse footing butts towards the front transverse footing brim between the pair left longitudinal footing sill and right longitudinal footing sill in manner of running through the top surface and bottom sole such that each tail of pair the left longitudinal footing sill and right longitudinal footing sill forms each of two prongs from an inner crotch edge of the longitudinal slit; a distance between the rivet through hole and the inner crotch edge of the longitudinal slit on the linking saddle is equivalent to a distance between the pair rivet fixing holes on the bottom sole of the bracket chassis; each said left insetting buttress and right insetting buttress is upwardly formed in a middle section of each corresponding left longitudinal footing sill and right longitudinal footing sill respectively in symmetrically parallel juxtaposition, and said rib plate is vertically disposed In a middle section of the pair left insetting buttress and right insetting buttress; each said left mating boss and right mating boss is outwardly formed in the middle section of each corresponding left insetting buttress and right insetting buttress respectively in symmetrically parallel juxtaposition horizontally; said crescent coupling sill is created at an intersection of the front transverse footing brim and the top surface; and each of the pair back transverse footing butts is backwardly formed in a rear section of each corresponding left longitudinal footing sill and right longitudinal footing sill respectively in symmetrically parallel juxtaposition, while each said left locking stopper and right locking stopper is upwardly formed over each one of the corresponding pair of back transverse footing butts respectively in symmetrically parallel juxtaposition.

2. A saddle bracket for wiper adapter as claimed in claim 1, wherein a distance defined between both outer walls of the pair of left insetting buttress and right insetting buttress on the linking saddle is equivalent to a distance defined between both outer walls of the pair left upright cheek and right upright cheek of the bracket chassis.

3. A saddle bracket for wiper adapter as claimed in claim 1, wherein a relative location of said left insetting buttress and right insetting buttress in the linking saddle corresponds with a relative location of said left insetting cutout and right insetting cutout in the bracket chassis, but a width and height of said left insetting buttress and right insetting buttress in the linking saddle are slightly smaller than a width and height of said left insetting cutout and right insetting cutout in the bracket chassis.

4. A saddle bracket for wiper adapter as claimed in claim 1, wherein a width defined between outer walls of the left locking stopper and right locking stopper on the linking saddle equals the width defined between outer walls of the left locking jetty and right locking jetty on the bracket chassis; a height defined from the bottom sole to a top surface of the left locking stopper on the linking saddle approximately equals the height defined from a bottom sole to the bottom surface of the left locking jetty on the bracket chassis; and a height defined from the bottom sole to a top surface of the right locking stopper on the linking saddle approximately equals a height defined from a bottom sole to the bottom surface of the right locking jetty on the bracket chassis.

\* \* \* \* \*